United States Patent
Gupta

(10) Patent No.: US 10,956,680 B1
(45) Date of Patent: Mar. 23, 2021

(54) SYSTEM AND METHOD FOR TEMPORAL EXPRESSIONS PROCESSING

(71) Applicant: Knexus Research Corporation, Oxon Hill, MD (US)

(72) Inventor: Kalyan Moy Gupta, Springfield, VA (US)

(73) Assignee: Knexus Research Corporation, Oxon Hill, MD (US)

(*) Notice: Subject to any disclaimer, the term of this patent is extended or adjusted under 35 U.S.C. 154(b) by 163 days.

(21) Appl. No.: 16/148,353

(22) Filed: Oct. 1, 2018

(51) Int. Cl.
| | | |
|---|---|---|
| G06F 40/253 | (2020.01) | |
| G06F 40/30 | (2020.01) | |
| G06F 40/205 | (2020.01) | |
| G06F 16/2452 | (2019.01) | |
| G10L 15/06 | (2013.01) | |

(52) U.S. Cl.
CPC ........... *G06F 40/30* (2020.01); *G06F 40/205* (2020.01); *G06F 40/253* (2020.01); *G06F 16/24522* (2019.01); *G10L 15/06* (2013.01)

(58) Field of Classification Search
CPC ... G06F 40/253; G06F 16/24522; G10L 15/06
See application file for complete search history.

(56) References Cited

U.S. PATENT DOCUMENTS

| | | | |
|---|---|---|---|
| 6,188,977 B1 * | 2/2001 | Hirota | G06F 40/253 704/9 |
| 8,131,756 B2 | 3/2012 | Carus et al. | |
| 8,606,564 B2 | 12/2013 | Merugu et al. | |
| 8,631,153 B2 | 1/2014 | Murthy et al. | |
| 8,661,001 B2 | 2/2014 | Eliashberg et al. | |
| 8,725,666 B2 | 5/2014 | Lemmond et al. | |
| 9,519,686 B2 | 12/2016 | Bufe et al. | |
| 9,535,904 B2 | 1/2017 | Prokofyev et al. | |
| 9,548,050 B2 | 1/2017 | Gruber et al. | |
| 9,563,915 B2 | 2/2017 | Brady et al. | |
| 9,614,983 B2 | 4/2017 | Sawamura | |
| 9,747,280 B1 | 8/2017 | Smyros et al. | |
| 9,767,903 B2 | 9/2017 | Cho | |
| 2004/0148173 A1 * | 7/2004 | Wu | G10L 15/06 704/270.1 |
| 2004/0243568 A1 * | 12/2004 | Wang | G06F 16/24522 |
| 2005/0246158 A1 * | 11/2005 | Weise | G06F 40/253 704/4 |
| 2010/0318398 A1 | 12/2010 | Brun et al. | |
| 2014/0372102 A1 * | 12/2014 | Hagege | G06F 40/295 704/9 |

* cited by examiner

*Primary Examiner* — Feng-Tzer Tzeng

(74) *Attorney, Agent, or Firm* — Williams Mullen; Thomas F. Bergert

(57) ABSTRACT

Embodiments of the present disclosure resolve natural language temporal expressions into temporal values via a temporal expressions processor that parses a given temporal expression into one or more semantic parses, selects an optimal semantic parse and resolves a value for the optimal semantic parse. The temporal values may pertain to one or more calendar dates, one or more calendar periods, one or more clock times, a clock time period and/or a combination of the above.

12 Claims, 4 Drawing Sheets

Fig. 4

*(screenshot 140)*

Please enter a temporal expression and press enter
12 weeks after October 13 2018          [Go]  [Reset]

Best Parse
Id-5b76d8c9f68084001ae71137
Requester-
Expression-12 weeks after October 13 2018
Result-CALENDAR_DATE 0-6
    TEMP_DISTANCE 0-2
        NUMBER 0-1
            12 0-1
        TEMP_UNIT 1-2
            WEEK 1-2
                weeks 1-2
    TEMP_REL 2-3
        AFTER 2-3
            after 2-3
    CALENDAR_DATE 3-6
        CALENDAR_MONTH 3-4
            OCTOBER 3-4
                October 3-4
        NUMBER 4-5
            13 4-5
        NUMBER 5-6
            2018 5-6

Resolved Value
2019-01-05T00:00:00.000Z 142                                          144

*(screenshot 150)*

Please enter a temporal expression and press enter
first weekday after june 13             [Go]  [Reset]

Best Parse
Id-5b76d9a4f68084001ae7113a
Requester-
Expression-first weekday after june 13
Result-CALENDAR_DATE 1-5
    DAY 1-2
        weekday 1-2
    TEMP_REL 2-3
        AFTER 2-3
            after 2-3
    CALENDAR_DATE 3-5
        CALENDAR_MONTH 3-4
            JUNE 3-4
                june 3-4
        NUMBER 4-5
            13 4-5

Resolved Value
2018-06-14T00:00:00.000Z 152                                          154

SYSTEM AND METHOD FOR TEMPORAL EXPRESSIONS PROCESSING

TECHNICAL FIELD

The present disclosure relates to temporal expressions processing, and more particularly to a system for processing natural language temporal expressions into electronic usable representations.

BACKGROUND

Natural language processing and speech recognition are routinely used to improve a user's experience and interaction with a software and system. For example, applications and products such as Amazon Alexa™, Microsoft Cortana™, and Google Home™ allow users to issue commands and questions to devices such as "What is the temperature outside?" or "Play NPR pod cast" and receive a response to control devices. Such applications use an approach to command processing called slot filling to fill values slots of predefined command templates. The values are often text fragments extracted from the natural language command. This extraction is typically performed by a combination of keywords and concepts identification, and shallow parsing. Some of these applications can process simple date and time setting commands such as "set my alarm to 3:30 AM." However, they cannot process command structures with complex recursive slots and those that require reasoning and inference of slot values. For example, they cannot process the command "set my alarm to an hour and half before sunrise". Processing such commands does not work because there is no time reference for "sunrise" from which the alarm time can be computed. It is noteworthy that the reference in the command could itself be indirect. For instance, instead of "sunrise", it could be "two hours after lunch". Therefore, the potential space of expressions to be resolved into values is infinitely large and cannot be effectively performed by current approaches.

SUMMARY OF THE DISCLOSURE

The present disclosure provides, in part, a temporal expressions processing device, system and method for accurately processing complex natural language temporal expressions (i.e., description of dates and times) that may require inferencing with one or more values within the expressions and with one or more values outside of the expressions to resolve them into concrete dates and times. The present disclosure can be used to dramatically improve a user's experience and usability of applications that require the user to input dates, times, and sets of dates and times. For instance, a user may specify a due date in a task management application by a plain English command statement such as "due in three working days" instead of selecting the date from a calendar widget. Likewise, in a calendaring and event management application, the user may schedule a recurring meeting or event by giving a command such as "schedule this meeting every Monday, first thing in the morning, for the next six months". In various embodiments, the system disclosed herein employs a host or temporal expressions processor that receives a natural language temporal utterance, parses the utterance to generate one or more semantic parses, selects an optimal semantic parse and resolves a temporal value for the optimal semantic parse. Resolved temporal values may pertain to one or more calendar dates, one or more calendar periods, one or more clock times, a clock time period and/or a combination of the above.

BRIEF DESCRIPTION OF THE DRAWINGS

FIGS. 4 and 5 are exemplary displays illustrating temporal output in accordance with embodiments of the present disclosure.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can incorporate a controller having a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a processor encompasses one or more processors, reference to a memory encompasses one or more memories, reference to a value resolver encompasses one or more value resolvers and so forth.

Figure 1:
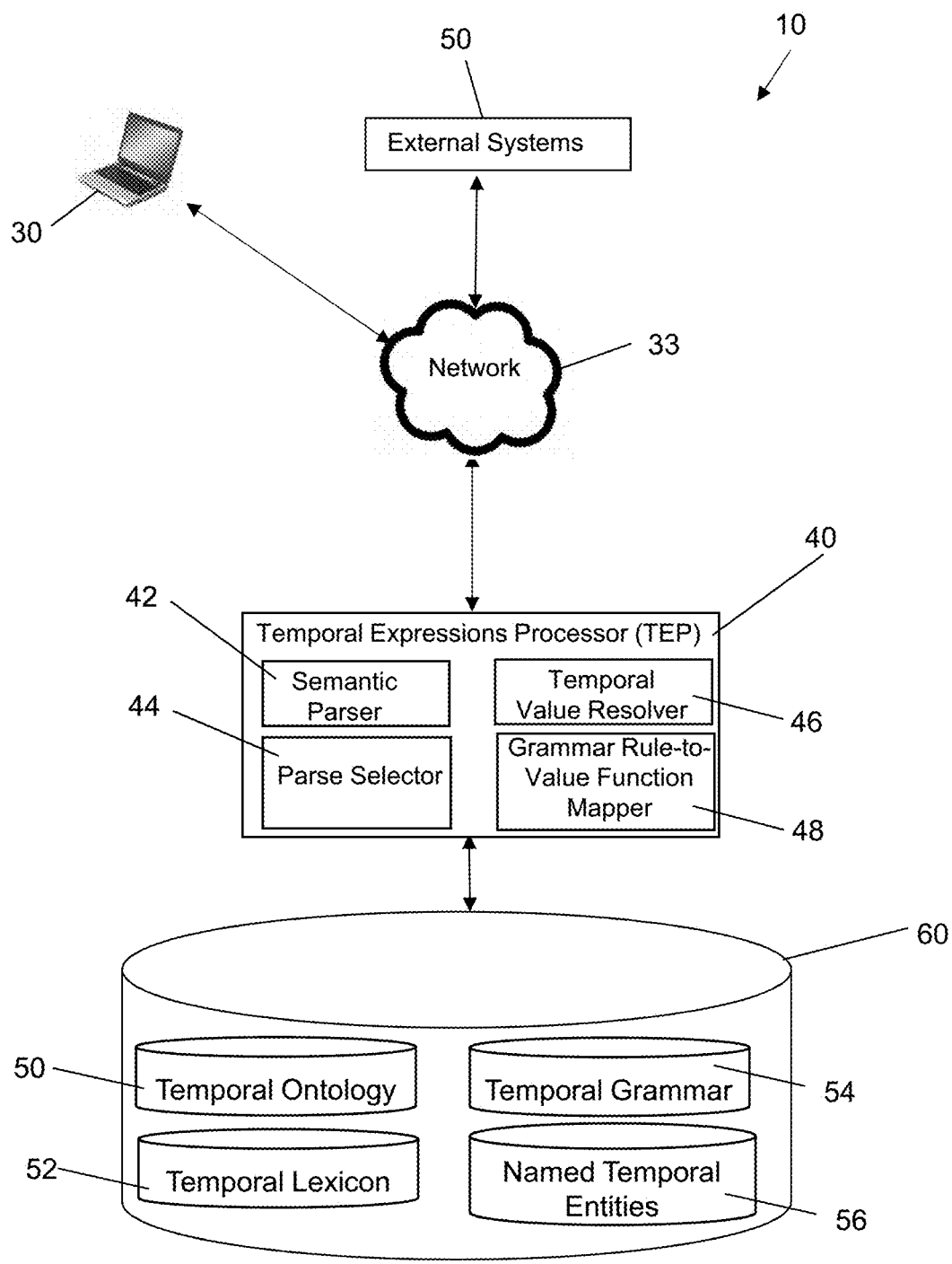
FIG. 1 is an exemplary system diagram of embodiments of the present disclosure.

FIG. 1 shows an exemplary system 10 according to embodiments of the present disclosure. The exemplary system 10 shows a user interface 30. The user interface 30 can be provided as a desktop computer, laptop computer, tablet, mobile communications device (MCD) or similar computing device, for example. Regardless of form factor, the user interface 30 can incorporate necessary processing power and memory for storing data and programming that can be employed by the processor(s) to carry out the functions and communications necessary to facilitate the processes and functionalities described herein. Each user interface or client computing device 30 can be configured to communicate with a host controller 40 that hosts components of the system described herein.

The user interface 30 allows users to interact with the system of the present disclosure, enter and receive inputs, receive reports and implement resolved temporal values into software applications and electronic systems, for example. While the user interface 30 can receive manually entered data, it will be appreciated that external elements and systems 50 can communicate data to host controller 40, in automated or manual fashion. As further shown in FIG. 1, host controller 40 can include components that automate and/or assist with analyzing temporal expressions, resolving temporal values and executing further actions as described herein. Such components can include, for example, temporal expressions processor 40, semantic parser 42, parse selector 44, temporal value resolver 46 and grammar rule-to-value function mapper 48. In various embodiments, the semantic parser 42, parse selector 44, temporal value resolver 46 and grammar rule-to-value function mapper 48 are sub-components of the temporal expressions processor 40.

Figure 2:
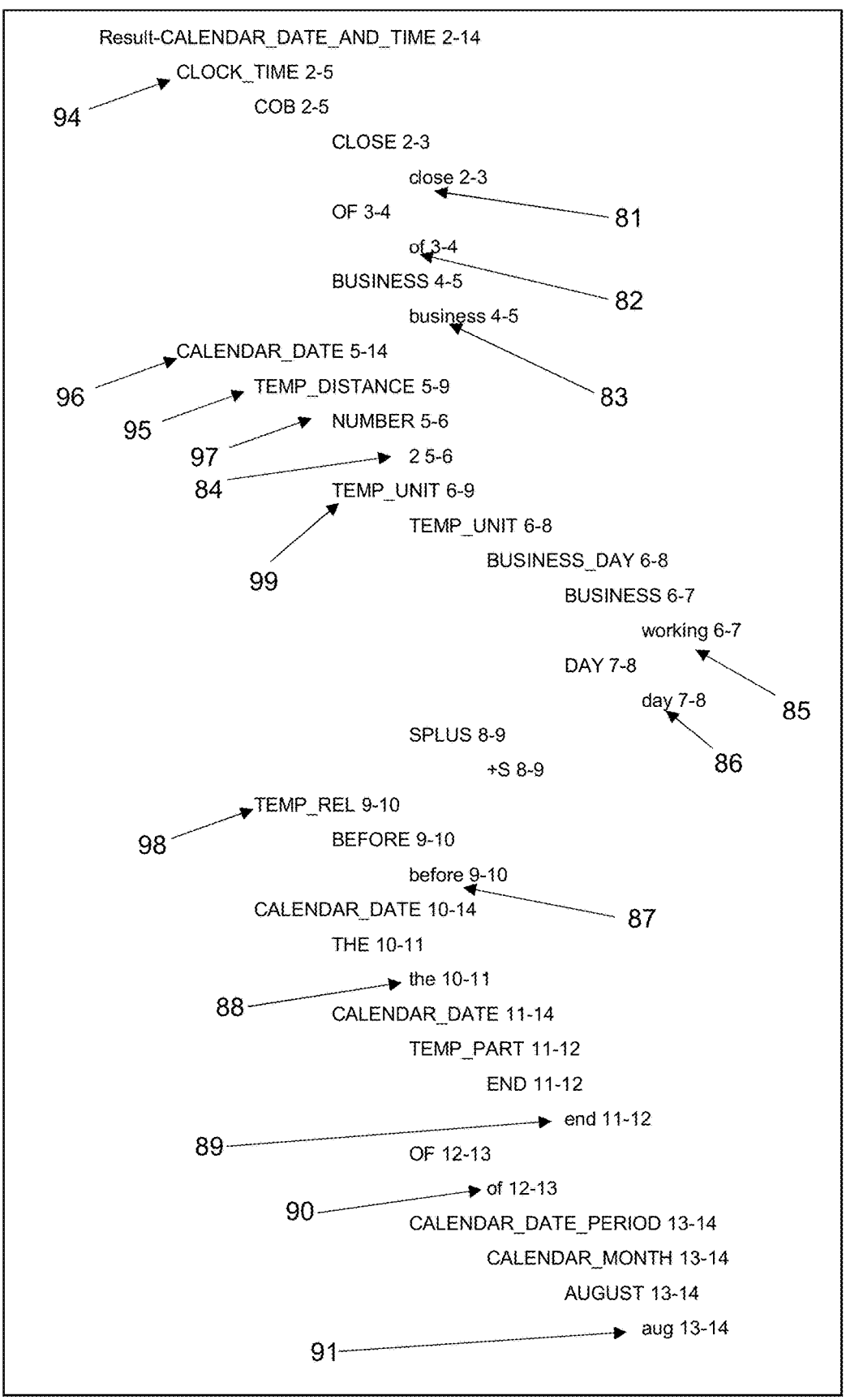
FIG. 2 illustrates an exemplary tree parse in accordance with embodiments of the present disclosure.

As described elsewhere herein, the temporal expressions processor (TEP) 40 can be provided as a collection of modules that converts a natural language description of dates and times (i.e., a temporal expression utterance) into calendar date and clock-time values suitable for direct computational use in software systems. The semantic parser 42 can read and parse received temporal expression utterances (TEUs), which may be provided in multiple forms according to various embodiments, including in writing and orally, for example. The file(s) can be provided in text files, audio files, video files and other types of files in accordance with various aspects of the present disclosure. In various embodiments, the semantic parser processes a TEU into one or more parse trees. A semantic parse tree is a tree data structure representing the underlying computational meaning of the TEU. FIG. 2 illustrates an example semantic parse tree 80 for the TEU, "due by close of business 2 working days before the end of August."

The bottommost elements, also known as the leaves, represent the words or terms in the utterance, the interim nodes represent the semantic concepts denoted by the words and the relationship between them. For example, the word "close" is shown at 81, "of" is shown at 82, "business" is shown at 83, "2" is shown at 84, "working" is shown at 85, "day" is shown at 86, "before" is shown at 87, "the" is shown at 88, "end" is shown at 89, "of" is shown at 90 and "aug" is shown at 91. The semantic concepts in the parse tree refer to the concepts in a temporal ontology associated with the present disclosure. For instance, the parse tree in FIG. 2 contains several temporal semantic concepts such as CLOCK_TIME 94, CALENDAR_DATE 96, and TEMP_REL 98. The TEP temporal ontology associated with the present disclosure contains the list of concepts necessary for describing the TEP grammar for parsing TEUs.

In various embodiments, as illustrated in FIG. 1, the TEP semantic parser 42 uses a temporal lexicon 52 and a temporal grammar 54 to generate one or more semantic parse(s). The temporal lexicon 52 contains multiple lexical entries, where each lexical entry relates a word to one or more semantic category or concept stored in the temporal ontology 50. The temporal ontology 50 is a formal naming and definition of the object types, object properties, concepts and relationships for use by embodiments of the present disclosure. In various embodiments, the temporal ontology 50 is pertinent to all aspects of time and date. For instance, the concept of a date can be an instance of an object in the temporal ontology, where the date has properties such as month, day and year, as well as expression options such as numerical, alphanumerical, and so forth. In various embodiments, the expression options associated with the date object can be highly granular, such as, for example, expressing Aug. 2, 2019 as "Aug. 2, 2019", "8-2-2019", "Aug. 2, 2019", "2 Aug. 2019", 2019 Aug. 2, and so forth. The temporal ontology 50 can also store logic such as when to represent the last day in February as "February 29" as opposed to "February 28" (i.e., in leap years), when to adjust current time based on U.S. daylight savings time, and when to represent the last day in a month as "28", "30" or "31", for example. The temporal ontology 50, temporal lexicon 52 and temporal grammar 54 can be stored in temporal database 60 in various embodiments.

The temporal lexicon 52 can be provided as a formal vocabulary along with knowledge about how the words in the vocabulary are used. For example, the temporal lexicon 52 can include nouns such as "date", "October", "Friday", "5 pm", verbs such as "get", "put", "calendar", "invite" and adjectives such as "free" (as in, "find a free date", for example), "open", "available", "next", etc. The temporal grammar 54 can include grammatical function words, such as articles (e.g., "the", "a", "an") and prepositions (e.g., "of", "in", "at", etc.). In various embodiments, temporal concepts that might appear as a preposition are stored as concepts in the temporal ontology. For example, the preposition "at" can be considered a temporal relation concept "AT" representing a specific time, such as "AT 5 pm". In various other embodiments, the term "at" may not reference a time but some other element, such as a location (e.g., "at the restaurant on the corner"). In embodiments where a word or phrase is not representative of a temporal expression, it can be ignored or otherwise handled so as not to interfere with temporal expression processing as described herein.

In various embodiments, the semantic parser 42 uses the temporal lexicon 52 to assign one or more concepts to each word or term in a given TEU. For instance, the terms "before" and "ago" may both refer to a temporal relation concept "BEFORE" contained in the temporal ontology 50.

Example code representations of context free grammar rules are shown below:
{"consequent": "TEMP_DISTANCE","antecedents": ["NUMBER","TEMP_UNIT"]},
{"consequent":"CALENDAR_DATE","antecedents": ["TEMP_PART","OF", "CALENDAR_DATE_PERIOD"]}, For instance, the concept TEMP_DISTANCE (i.e., the consequent of the rule) is a combination of NUMBER and TEMP_UNIT (i.e., the rule antecedents). A parse node in a parse tree and its immediate children correspond to a grammar rule, where the node in question is the consequent of the grammar rule and the children are the antecedent of the grammar rule. For example, as shown in FIG. 2, the parse node TEMP_DISTANCE 95 is the consequent of a grammar rule, and the children "NUMBER" 97 and "TEMP_UNIT" 99 are antecedents. The aggregation of TEMP_DISTANCE 95, "NUMBER" 97 and "TEMP_UNIT" 99 comprise the grammar rule. If the value for a TEMP_UNIT is "days" and the value for a NUMBER is "five", the consequent TEMP_DISTANCE is thus "five days", and this consequent can be represented in a highly common unit, such as seconds, for example, to assist with processing as disclosed herein.

In various embodiments, the semantic parser 42 implements a custom fault-tolerant bottom-up context free chart-parsing algorithm that uses a temporal grammar encoded using context-free grammar rules, such as the examples above. The semantic parser is fault-tolerant in the sense that it can intelligently estimate the semantic category of a word when it encounters words that do not have a lexical entry in the temporal lexicon 52 enabling it to continue parsing where it would otherwise fail. For example, "sunrise" may not be a lexical entry in the temporal lexicon 52. Nevertheless, the system as disclosed herein can estimate that this term is in a semantic category called "CLOCK_TIME". In various embodiments, the corresponding clock time accorded to "sunrise" can be made by employing a known or determined location for the individual(s) involved and looking up through external sources the clock time associated with sunrise for the associated location. In addition to the above, for many terms such as numbers that cannot be enumerated, the semantic parser 42 uses special semantic categorizers, thereby implicitly increasing the terms covered by the temporal lexicon. Semantic categorizers may be, for example, a number detector, name detector, holiday detector and so forth.

According to various embodiments of the present disclosure, the semantic parser 42 returns one or more parses that cover the largest sequence of words in the TEU. It will be appreciated that multiple different parse trees can represent multiple different interpretations of the TEU that resolve to different date and time values. For example, the phrase "sometime next week" may be a concept associated with a calendar date period or a clock time period. According to the present disclosure, these different interpretations can be resolved to different date and time values depending upon which concept is considered. Further, the semantic parser 42 can consider other words surrounding this ambiguous phrase in order to assess an appropriate rule for mapping. Ultimately, a meaning is extracted from the parsed expression.

Once an expression is parsed, at least two additional approaches can be taken. First, the system can pass all of the parses for temporal value resolution by the temporal value resolver 46, or second, the system can select the most promising parse for temporal value resolution by the temporal value resolver 46.

With regard to the second approach of selecting the most promising parse for temporal value resolution, the parse selector 44 can, for example, select the smallest trees that cover the largest span of words in the TEU. For example, in FIG. 2, the span of words can range from the smallest span of words (e.g., one word) to a largest span of words, which occurs from words 2 to 14. If there are multiple trees that cover the same span, then the system can operate to select the tree with the fewest number of nodes. Alternative heuristics may include, for example, employing the deepest parse tree, or the parse tree with the largest number of nodes (i.e., the most descriptive). Other alternative heuristics may include employing a randomly selected parse tree, the first parse tree or the last parse tree, for example.

With regard to temporal value resolution, the temporal value resolver 46 can operate so as to assign a concrete denotation value to a symbol. For example, the symbol 10 AM is resolved to a CLOCK_TIME value of 10:00:00 AM. The temporal value resolver 46 computes the date and time values denoted by the root node of the parse tree, thereby identifying the date and time value intended by the user utterance. In various embodiments, the temporal value resolver 46 employs a top-down and bottom-up recursive parse node value resolution, using value resolution functions. An example code representation of top-down and bottom-up recursive parse node value resolution appears below.

Example top-down and bottom-up recursive parse node value resolution:
1. Function resolveNodeValue (Node)
2. IF nodeIsLeaf(node)
3. return leafNodeValue( );
4. ELSE {
5. IF (all children node values are resolved) {
   Resolve this node by finding and using the correct value resolution function corresponding to the grammar rule applicable to the node and children.
   Return computed node values.
}
6. ELSE {
//resolve node value of children
7. For (child of AllChildren) {
8. resolveNodeValue(child)
9.}//end
10.}//endif
} //endif As illustrated above, the recursive function resolveNodeValue can be called with the root node of the parse as the argument. Line 8 of the function recursively calls itself with the child value until it reaches the leaf nodes. It resolves the leaf node based on the node type default value or a temporal entity value resolution, and then recursively returns (i.e., goes bottom up from children to parents) to line 5.

An example code representation of a value resolution function appears below.

Example value resolution function:
//Distance is time in seconds
function resolveDateFromTemporalDistance(distance: Number, direction, referenceDate) {
  1. Let refDateInSeconds=convertToSeconds(referenceDate)
  2. Let dateToReturnInSeconds=0;
  3. If (direction==BEFORE)
  4. dateToReturnInSeconds=refDateInSeconds−distance
  5. Else
  6. dateToReturnInSeconds=refDateInSeconds+distance;
  7.} return dateFrom(dateToReturnInSeconds) //A function that converts seconds to date In accordance with the present disclosure, a value resolution function takes one or more value parameters as input and returns a resulting value. In various embodiments, the temporal value resolver 46 contains the necessary set of value resolution functions that covers the entire temporal grammar 54. The value resolution functions provide a basis for reasoning and inferencing one temporal value from another. Introduction of new grammar rules or changes to the existing grammar rules might necessitate introduction of new functions or new updates to existing ones to account for additional reasoning and inference. Such can be introduced into the system of the present disclosure via user interface 30 or external systems 50, according to various embodiments. The above example value resolution function computes and returns a new date for a parse for the expression "3 days ago" based on reference Date (e.g., Today), distance (e.g., 3 days or 25900 seconds) and Direction=BEFORE). If "Today" is Aug. 12, 2019, then the expression "three days ago" would be resolved to a value of Aug. 9, 2019 according to the above example.

Named Temporal Entities and Their Value Settings

In various embodiments, certain temporal entities such as holidays (e.g., Christmas Day), and named times (e.g., Close of Business) have stored resolved values for direct lookup and resolution. Such temporal entities can be stored, for example, in a named temporal entities database 56, which can be part of main temporal database 60 as shown in FIG. 1. Example settings for named temporal entity values appear below.

{"Named Temporal Entities":
  "Christmas Date": "12/25/yyyy"
  "Close of Business": "5:00 PM"}

Grammar Rule-to-Value Function Mapper

As illustrated above, the temporal value resolver 46 must look up and find an appropriate value resolution function. In various embodiments, each grammar rule must have a corresponding value resolution function needed for inferencing. The grammar rule-to-value function mapper 48 enables the temporal value resolver 46 to look up the appropriate function and call the function with the appropriate parameter values. For instance, the resolveDateFromTemporalDistance function shown above is looked up when resolving the example grammar rule shown above. Further the values of node TEMP_DISTANCE, TEMP_REL, and CALENDAR_DATE are mapped to the function arguments. In various embodiments, one or more grammar rules may map to a temporal value resolution function.

Figure 3:
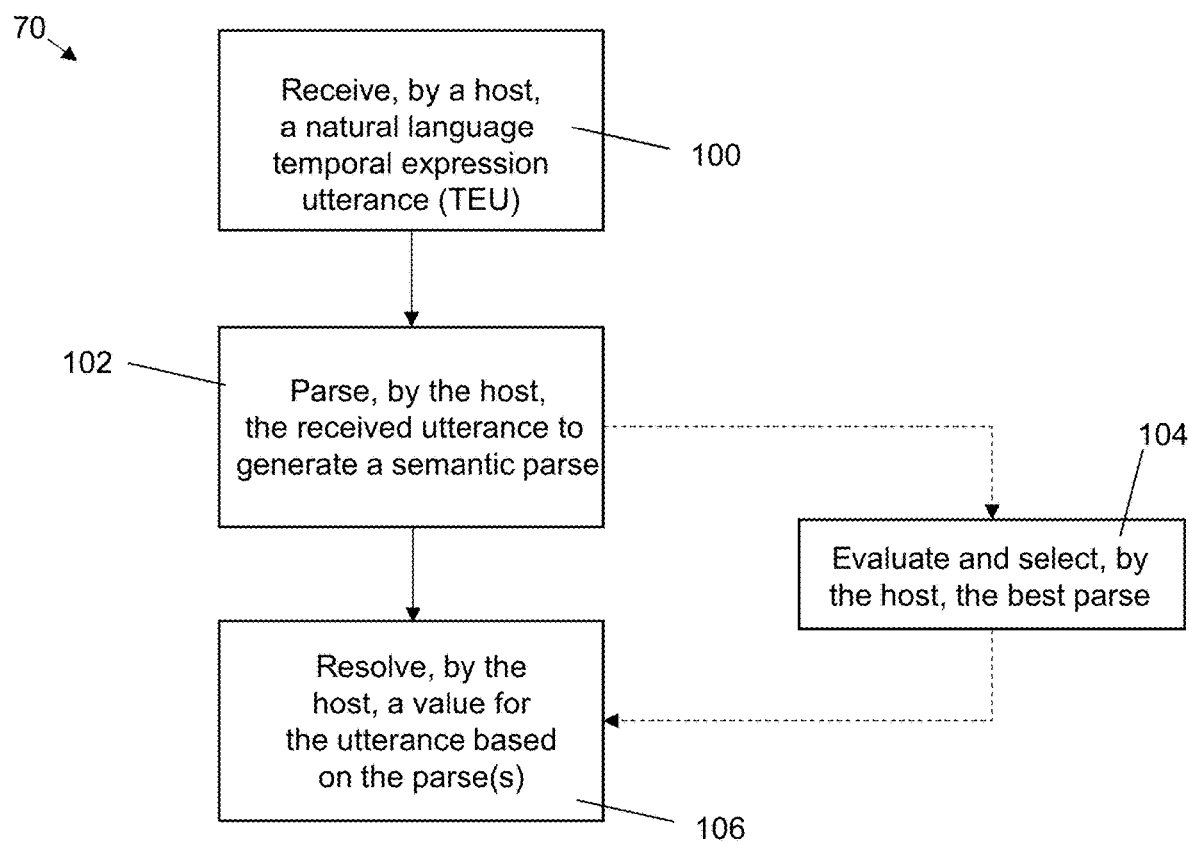
FIG. 3 shows a diagram illustrating an exemplary temporal expression resolving process in accordance with aspects of the present disclosure.

FIG. 3 is a flow chart illustrating an exemplary process 70 in accordance with the present disclosure. As shown at 100, the temporal expressions processor, or host, receives a natural language command or utterance from a user or system comprising a natural language temporal utterance or description. The utterance may or may not contain dates and times, but it contains some sort of temporal expression. For instance, a command for setting a due date "due by close of business 2 working days before the end of month" may be received. The utterance may be provided as text input with keyboard entry, or speech input that is converted into text by a speech recognition software, for example. In various embodiments, the host can process speech input whether received as an audio file or video file with speech contained therein.

As at 102, the host parses the semantics of the received utterance. As described elsewhere herein, the host can operate with semantic parser 42, which can employ the temporal lexicon and the temporal grammar to generate one or more semantic parses, assigning one or more concepts to each word or term in a given TEU. The multiple generated semantic parses represent multiple different interpretations of the TEU that can be resolved to different date and time values.

As at 106, all of the generated parses are passed to the temporal value resolver, which resolves a value for each of the generated semantic parses. In an alternative embodiment, as illustrated by the dashed lines and as at 104, the host evaluates the generated semantic parses and selects the best parse prior to the temporal value resolver resolving a value for the best parse as at 106. In resolving one or more values for the parse(s), the temporal value resolver and/or host can generate a temporal outcome or result in the form of one or more time and/or date values. For example, a resolved value of 2019-01-08 can be generated by the host as a temporal result representing Jan. 8, 2019. It will be appreciated that resolved temporal values may pertain to one or more calendar dates, one or more calendar periods, one or more clock times, a clock time period and/or a combination of the above.

In various embodiments, the host determines whether to pass all of the generated parses for temporal value resolution by the temporal value resolver 46, or select the most promising parse for temporal value resolution by the temporal value resolver 46. This determination can be performed automatically according to a programmed selection, such as a user indicating a selection to the host for passing all of the generated parses to the temporal value resolver or alternatively indicating a selection to the host for selecting the most promising parse, for example. This determination can also be made by the host according to aspects of the generated parses. For example, if the total number of generated parses is low, the host may determine to pass all of the generated parses to the temporal value resolver. In the event all of the generated parses are passed for temporal value resolution, multiple temporal values may be determined. In such case, a single resolved temporal value may be selected automatically or through user input in order to employ the selected resolved temporal value in a software program or other application. For example, if the temporal utterance "schedule exercise before sunrise" is received, and a first resolved value is one minute prior to an anticipated sunrise clock time and a second resolved value is one hour prior to an anticipated sunrise clock time, a user may select the second option since such an option would permit sufficient time for engaging in the desired exercise prior to sunrise.

FIGS. 4 and 5 illustrate example displays 140 and 150, respectively, that may be produced pursuant to a temporal value resolution in accordance with aspects of the present disclosure. As shown in display 140 of FIG. 4, the temporal utterance "12 weeks after Oct. 13, 2018" generates a parse tree 142 determined to be the best parse, which is resolved by the temporal value resolver to have an outcome and/or value 144 of "2019-01-05". As shown in display 150 of FIG. 5, the temporal utterance "first weekday after June 13" generates a parse tree 152 determined to be the best parse, which is resolved by the temporal value resolver to have an outcome and/or value 154 of "2018-06-14". It will be appreciated that the generated outcome can be deployed in various application environments to facilitate desired tasks. For example, if a business meeting is proposed for the "first weekday after June 13" and the temporal value resolver produces the outcome of "2018-06-14", this value can be used in a calendaring software application for the proposed meeting. In such an example, any party who may be desired or required for the meeting can be notified about the proposed date of 2018 Jun. 14 and further calendaring can be effectuated thereafter.

It will be appreciated that the system of the present disclosure can incorporate and accommodate a large range of expressions and a single semantic grammar. Further, the recursive parse node value resolution using one or more value resolution functions as described herein overcomes challenges associated with effective temporal value resolution.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more central servers, central controllers, or remote hosts; (b) one or more personal computing devices, such as desktop computers, laptop computers, tablet computers, personal digital assistants, mobile phones, and other mobile computing devices.

Thus, in various embodiments, the system of the present disclosure includes: (a) one or more computing devices in combination with one or more central servers, central controllers, or remote hosts; (b) one or more personal computing devices, and one or more central servers, central controllers, or remote hosts, alone, or in combination with one another; (c) a single central server, central controller, or remote host; and/or (d) a plurality of central servers, central controllers, or remote hosts in combination with one another.

In certain embodiments in which the system includes a personal computing device in combination with a central server, central controller, or remote host, the central server, central controller, or remote host is any suitable computing device (such as a server) that includes at least one processor and at least one memory device or data storage device. As further described herein, the personal computing device includes at least one processor configured to transmit and receive data or signals representing events, messages, commands, or any other suitable information between the personal computing device and the central server, central controller, or remote host. The at least one processor of the personal computing device is configured to execute the events, messages, or commands represented by such data or signals in conjunction with the operation of the personal computing device. Moreover, the at least one processor of the central server, central controller, or remote host is configured to transmit and receive data or signals representing events, messages, commands, or any other suitable information between the central server, central controller, or remote host and the personal computing device. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the personal computing device. Further, one, more than one, or each of the functions of the at least one processor of the personal computing device may be performed by the at least one processor of the central server, central controller, or remote host.

In certain such embodiments, computerized instructions for controlling the display by the personal computing device are executed by the central server, central controller, or remote host. In such "thin client" embodiments, the central server, central controller, or remote host remotely controls any output displayed by the personal computing device, and the personal computing device is utilized to display such output and to receive one or more inputs or commands. In other such embodiments, computerized instructions for controlling the display by the personal computing device are communicated from the central server, central controller, or remote host to personal computing device and are stored in at least one memory device of the personal computing device. In such "thick client" embodiments, the at least one processor of the personal computing device executes the computerized instructions to control any output displayed by the personal computing device.

In embodiments in which the system includes: (a) a personal computing device configured to communicate with a central server, central controller, or remote host through a data network; and/or (b) a plurality of personal computing devices configured to communicate with one another through a data network, the data network is a local area network (LAN) in which the personal computing device(s) are located substantially proximate to one another and/or the central server, central controller, or remote host. In various other embodiments, the data network is a wide area network (WAN), an internet (such as the Internet) or an intranet.

The central server, central controller, or remote host and the personal computing device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor. In various embodiments, part or all of the program code and/or the operating data described above is stored in at least one detachable or removable memory device including, but not limited to, a cartridge, a disk, a CD ROM, a DVD, a USB memory device, or any other suitable computer readable medium. In certain such embodiments, an operator (such as a gaming establishment operator) and/or a player uses such a removable memory device to implement at least part of the present disclosure.

The invention claimed is:

1. A method for processing a natural language temporal utterance, comprising:
   receiving, by a host, a natural language temporal utterance comprising a span of words;
   parsing, by the host, the received natural language temporal utterance to generate a plurality of semantic parses, wherein the parsing comprises processing the natural language temporal utterance into one or more parse trees;
   evaluating, by the host, the plurality of semantic parses and selecting, by the host, an optimal semantic parse from the plurality of semantic parses, wherein selecting an optimal semantic parse comprises selecting a smallest tree of the one or more parse trees that covers a largest span of the span of words in the natural language temporal utterance; and
   resolving, by the host, a temporal value for the optimal semantic parse, wherein the temporal value comprises at least a calendar date, a calendar range or clock time value converted from the natural language temporal utterance.

2. The method of claim 1, wherein the parsing generates the plurality of semantic parses as different interpretations of the natural language temporal utterance.

3. The method of claim 1, wherein the parsing comprises processing the received natural language temporal utterance using a temporal lexicon and a temporal grammar.

4. The method of claim 1, wherein the resolving comprises a recursive parse node value resolution using a value resolution function.

5. The method of claim 1, wherein the resolving comprises employing a value resolution function based on at least one grammar rule.

6. The method of claim 1, wherein the natural language temporal utterance does not comprise a calendar date or a clock time.

7. A system for processing a natural language temporal utterance, comprising:
   at least one processor; and
   at least one memory device storing a plurality of instructions which, when executed by the at least one processor, cause the at least one processor to:
   receive a natural language temporal utterance comprising a span of words;
   parse the received natural language temporal utterance to generate a plurality of semantic parses, wherein the parsing comprises processing the natural language temporal utterance into one or more parse trees;
   evaluate the plurality of semantic parses and selecting, by the host, an optimal semantic parse from the plurality of semantic parses, wherein selecting an optimal semantic parse comprises selecting a smallest tree of the one or more parse trees that covers a largest span of the span of words in the natural language temporal utterance; and
   resolve a temporal value for the optimal semantic parse, wherein the temporal value comprises at least a calendar date, a calendar range or clock time value converted from the natural language temporal utterance.

8. The system of claim 7, wherein the instructions further cause the at least one processor to parse the received natural language temporal utterance to generate the plurality of semantic parses as different interpretations of the natural language temporal utterance.

9. The system of claim 7, wherein the instructions further cause the at least one processor to parse the received natural language temporal utterance using a temporal lexicon and a temporal grammar.

10. The system of claim 7, wherein the wherein the instructions further cause the at least one processor to resolve the temporal value for the optimal semantic parse using a value resolution function.

11. The system of claim 10, wherein the instructions further cause the at least one processor to employ the value resolution function based on at least one grammar rule.

12. The system of claim 7, wherein the natural language temporal utterance does not comprise a calendar date or a clock time.

\* \* \* \* \*